Patented Mar. 11, 1941

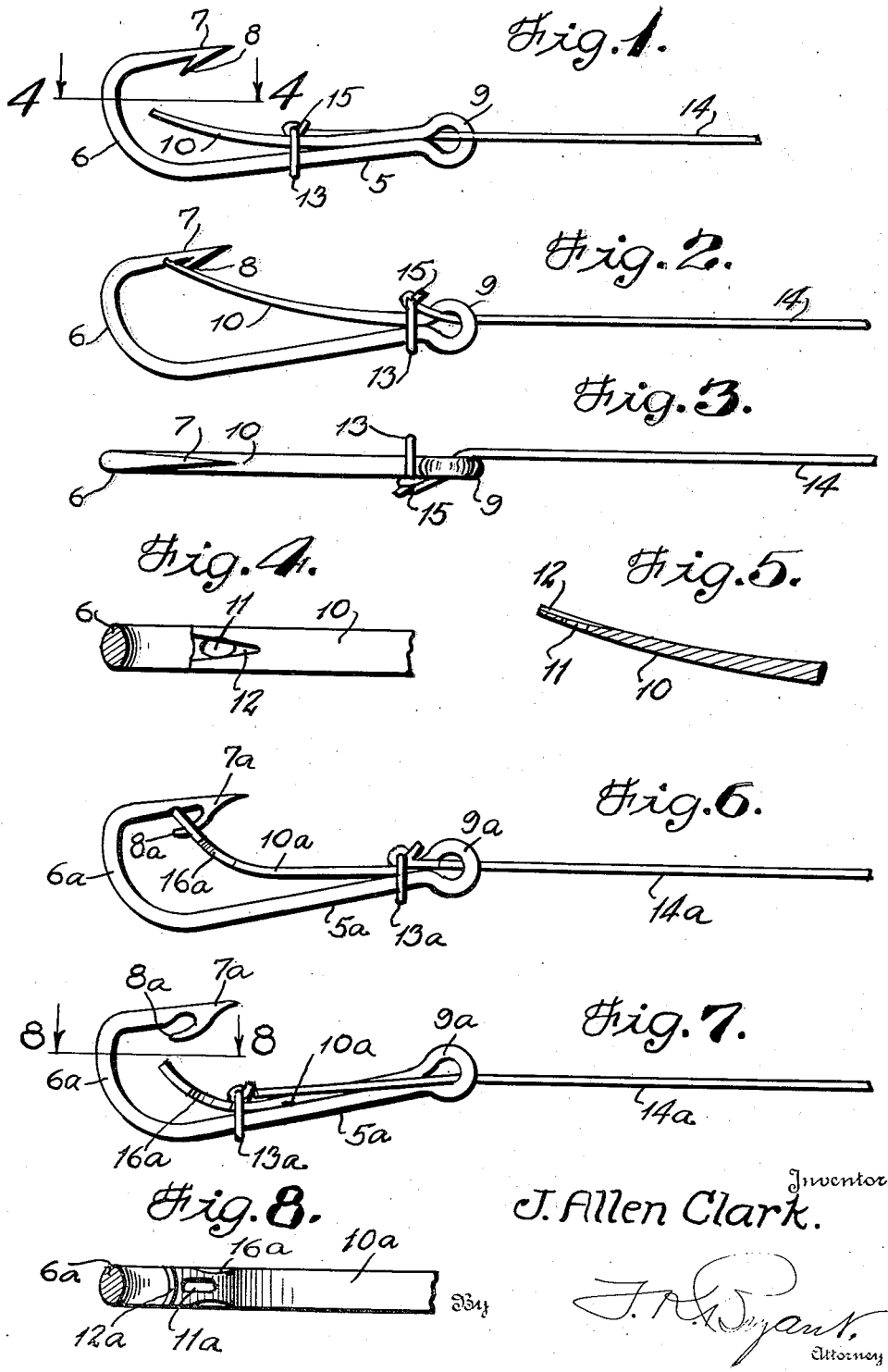

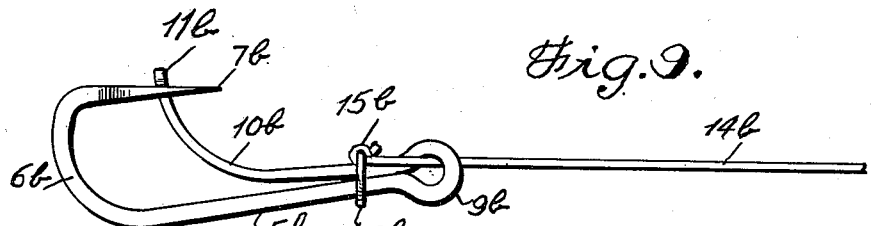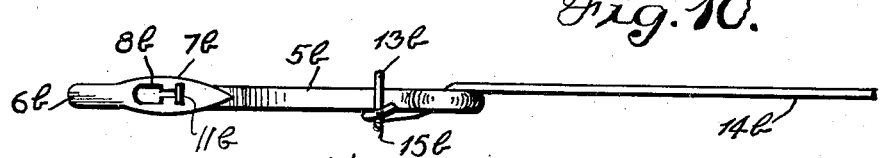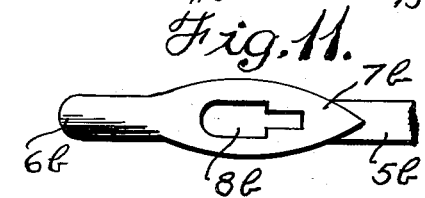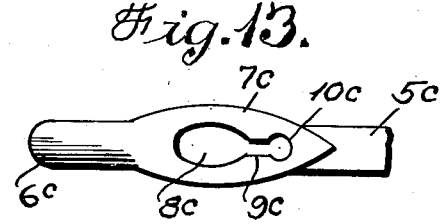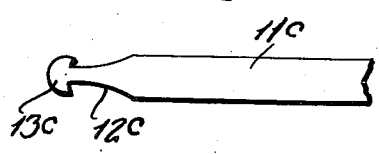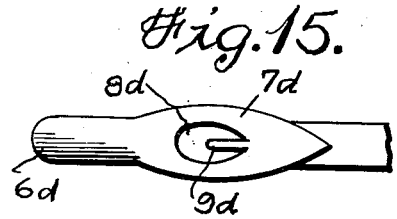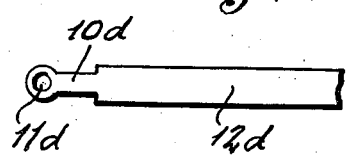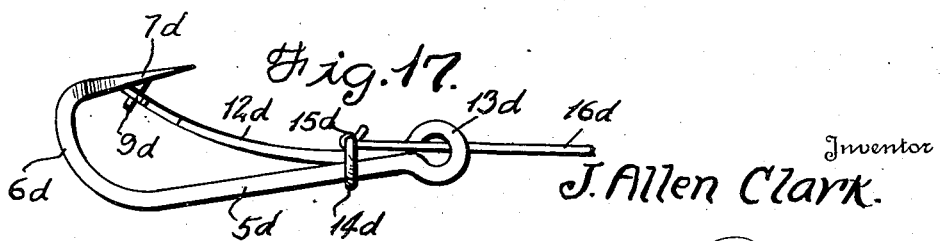

2,234,516

UNITED STATES PATENT OFFICE 2,234,516

FISHHOOK

J Allen Clark, Atlanta, Ga.

Application March 30, 1939, Serial No. 265,045

5 Claims. (Cl. 43—27)

This invention relates to improvements in fishhooks and more particularly to fishhooks having means for trapping the fish on the hook.

The primary object of this invention is to provide a fishhook of the above mentioned character in which a spring arm is formed on the loop portion of the hook and has its free end presented to the spear portion of the hook whereby a fish when caught on the hook will be trapped and prevented from being displaced. The end of the spring arm unites at the eye slightly beyond the penetrating part of said hook, which prevents the hook from straightening or bending and otherwise uniting the entire unit as though it were a completed locked, tied or united ring.

A further object of this invention is to provide a fishhook of the above mentioned character in which the spear portion of the hook is guarded against accidental entangling with weeds and rocks while casting.

A further object of this invention is to provide a fishhook of the above mentioned character which will assist in retaining the bait on the hook and prevent the same from becoming lost as a result of a fish nibbling the bait off of the hook.

A still further object of this invention is to provide a fishhook of the character described in which the trap spring member when released by a sudden pull on the line by the fish, will have a locking engagement with the spear portion of the hook.

A still further object of this invention is to produce a trap hook which will be simple in construction and which may be cheaply and easily produced.

Other objects and advantages of the invention will become apparent during the course of the following description taken with the drawings, wherein, Figure 1 is a side elevational view of the hook embodying the invention, illustrating the trap spring and showing the manner in which the same is located with respect to the spear portion when in set position;

Figure 2 is a similar view showing the trap spring released by the lead line;

Figure 3 is a top elevational view of the trap hook showing the manner in which the lead line is connected;

Figure 4 is a cross-sectional view taken on line 4—4 of Figure 1, looking in the direction of the arrows, illustrating the free end formation of the trap spring;

Figure 5 is a longitudinal cross-sectional view of the trap hook spring showing the construction of the spear engaging portion;

Figure 6 is a side elevational view of a modified form of the invention, illustrating a differently shaped fishhook spear and trap spring engaging portion;

Figure 7 is a side elevational view of the modification shown in Figure 6, illustrating the trap hook in its operative position;

Figure 8 is a horizontal cross-sectional view taken on line 8—8 of Figure 7, looking in the direction of the arrows, illustrating the spear head engaging end of the trap spring arm;

Figure 9 is a side elevational view of another modified form of the invention illustrating the trap hook in an inoperative position;

Figure 10 is a top elevational view of the same illustrating the formation of the fishhook spear head;

Figure 11 is a top elevational view of a further modified form of the invention showing the spear head greatly enlarged;

Figure 12 is a top elevational view of a trap spring corresponding to eye portion of the spear head in Figure 11;

Figure 13 is a further modified form of the invention illustrating in top elevation a fishhook spear head having an eye for receiving the free locking end of the trap spring;

Figure 14 is a top elevational view of a free end portion of a trap spring arm adapted to cooperate with the eye portion of the spear head shown in Figure 13;

Figure 15 is a top elevational view of a further modified form of the invention showing a fishhook spear head of a different configuration;

Figure 16 is a top elevational view of a trap spring end to be used in conjunction with the spear head shown in Figure 15; and Figure 17 is a side elevational view of the modified form of the invention shown in Figures 15 and 16.

In the drawings wherein for the purpose of illustrating the invention and wherein like reference characters will be employed to designate like parts throughout the same, and wherein the reference character 5, in Figures 1 to 5 inclusive, will generally be employed to designate a fishhook having a hook portion 6 and a free end 7 formed into a spear head having a barb 8.

The hook 5 is also provided with a loop portion 9 formed on the opposite end of the hook and said loop portion 9 is continued rearwardly, parallel with the stem portion of the hook as at 10 to form a spring trap member having in the free end thereof, an opening 11 for receiving the barb 8 when said spring trap member has been sprung.

It will be noted, that the spring trap member 10 tapers from the looped portion of the hook to the free end thereof and that the free end is provided with a V-shaped cut-away portion 12, confining the opening 11 so that the portion of the trap hook spring member contacting the barb of the spear head will receive the barb in the opening 11 and the pointed portion of the hook 7 will be received in the V-shaped cut away portion 12.

Slidably mounted on the trap spring 10 and stem portion of the hook 5 is a ring 13 which is adapted to be moved to the position shown in Figure 1 to hold the spring trap member 10 in a compressed position. A lead line 14 may have one of its ends connected to a fish line while the opposite end is tied to the ring member 13 as at 15. When the hook is baited and cast, should a fish strike the bait, the hook will penetrate the mouth of the fish, upon a sudden pull of the lead line, the ring member 13 will slide on the stem portion of the hook and trap spring to the position shown in Figure 2, thereby locking the fish on the hook and preventing accidental displacement thereof.

In the form of the invention shown in Figures 6 to 8 inclusive, the fishhook 5a is formed with a stem portion on one end of which is a hook 6a having the free end formed with a spear head 7a providing a barb 8a extending inwardly toward the hook portion 6a thus producing an eye opening for locking engagement with the trap spring which will be later described.

On the opposite end of the fishhook stem 5a is a loop 9a and said hook is extended toward the spear head 7a in the form of a spring trap arm 10a. The free end of the spring trap arm is slightly curved and is provided with an elongated opening 11a for receiving the barb 8a. Further, the free end of the spring trap arm 10a is cut away as at 12a to conform to the curved portion of the spear head 7a at the underside thereof when the spring trap member is in an inoperative position.

A sliding ring 13a is movable on the fishhook stem 5a and spring trap arm 10a and may be arranged as shown in Figure 7 to hold the trap spring arm 10a in operative position. Also, a lead line 14a has one of its ends connected to the ring 13a after being threaded through the loop 9a so that when there is a strike on the hook, the ring 13a will be released from the opposite notched portions 16a on the free end of the spring trap arm and will be moved to the position shown in Figure 6 to completely trap the fish and prevent the fish's mouth from becoming dislodged on the hook portion 6a.

In Figures 9 to 12, the invention is shown being applied to a fishhook having a differently shaped spear head and the reference character 5b will be employed to designate the stem portion of a fishhook and said hook is provided with a curved portion 6b terminating in a flat barbless spear head 7b having an elongated slot 8b formed therein as shown in Figure 11. The opposite end of the stem 5b is provided with a loop 9b having an extension 10b slightly curved toward the spear head 7b and having formed on the free end thereof a tongue 11b having an enlarged head 12b adapted to be locked in the elongated slot 8b when the spring trap extension 10b is in the position shown in Figure 9. A slide ring 13b is mounted on the spring trap member 10b and stem portion of the hook 5b and is connected to a lead line 14b threaded through the loop 9b as at 15b. The operation of the hook and trap spring member is identical to the form of the invention shown in Figures 1 to 8 inclusive.

In the modification shown in Figures 13 and 14, the fishhook stem 5c is curved as at 6c and is provided with a spear head 7c having a key hole slot 8c formed therein including a reduced portion 9c entering an enlarged opening 10c. The spring trap arm 11c is provided with a reduced end portion 12c terminating in a head 13c slightly larger than the reduced portion 12c. In operation, the spring trap tongue 11c is presented to the fishhook 6c so that the reduced end 12c may enter the slot 8c in the spear head and by further movement, the head 13c may be moved into locking engagement with the opening 10c by the same passing through the reduced portion 9c of the key hole slot 8c.

In the modification shown in Figures 15 to 17 inclusive, the fishhook stem 5d is provided with a curved hook portion 6c, having a pointed spear shaped end 7a into which is cut an opening 8d as most clearly shown in Figure 15. Extending into the opening and formed integral with the spear head is a barb 9d adapted to be engaged by a tongue 10d having an aperture 11d formed in the end thereof. The tongue 10d is formed on the free end of the spring trap extension 12d which connects with the stem portion 5a through a loop portion 13d. When the spring trap extension 12a is in the inoperative position shown in Figure 17, the barb 9d extends through the aperture 11d in the tongue 10a and said tongue partially protrudes through the opening 8d.

A slide ring 14d is mounted on the stem portion of the fishhook and spring trap arm 12d and connected to the slide ring as at 15d is a lead line 16d which may be connected to a conventional fish line after being passed through the loop 13d.

It is to be understood that the invention may be applicable to other types of fishhooks and that the forms shown in the drawings are to be taken as preferred forms of the same and that various changes in the shape, size and arrangement of parts may be resorted to without departing from the spirit of the invention or the scope of the sub-joined claims.

I claim:

1. A fishhook of the character described comprising a hook member having a spear head, a trap spring having one end integral with the hook member with its free end presented to the spear head and means frictionally engaged with said hook member and trap spring and movable longitudinally thereof and by said frictional engagement being retained in shifted positions for flexing the trap spring for releasably holding the free end of the trap spring away from the spear head.

2. In a fishhook of the character described, an integral structure comprising a stem portion with a spear head at one end thereof, and a spring member having a free end cooperating with the spear head, and means slidable on the stem portion and spring member and frictionally engaged therewith for normally spacing the free end of the spring member from said spear head.

3. A fishhook comprising a stem portion, a hook formed on one end of the stem, a spear head terminating the hook, a spring trap member associated with the stem adapted to have its free end presented to the spear head, means on the free end of the spear head for locking engagement with the spring trap member, and releasable means frictionally engaged with the hook stem and spring trap member for normally holding the spring member away from the spear head.

4. A fishhook comprising a stem portion having a hook formed on one end and a line loop on the other end, a spear head formed on the free end of the hook, a spring arm extending from and connected to the loop portion of the stem, and a tongue on the free end of the spring arm adapted to enter an aperture in the spear head to lock the spring arm thereto.

5. A fishhook comprising a stem portion having a hook formed on one end and a line loop at the other end, a spear head at the end of the hook, a spring trap arm extending from the line loop and having its free end presented to the spear head, a locking tongue formed on the free end of the spring trap arm adapted to be received in an opening formed in the spear head and releasable means associated with the stem and spring trap member for normally holding the spring trap member away from the spear head.

J ALLEN CLARK.